United States Patent [19]

Baron

[11] Patent Number: 4,582,290

[45] Date of Patent: Apr. 15, 1986

[54] AUTOMOBILE RADIO ANTI-THEFT RETAINER

[76] Inventor: Jeffrey N. Baron, 66 Huron Ave., Cambridge, Mass. 02138

[21] Appl. No.: 476,508

[22] Filed: Mar. 18, 1983

[51] Int. Cl.[4] ............................................. F16M 13/00
[52] U.S. Cl. .................. 248/551; 248/27.1; 248/201
[58] Field of Search ................... 248/551, 201, 27.1, 248/154, 500, 507, 675; 70/58

[56] References Cited

U.S. PATENT DOCUMENTS

| | | | |
|---|---|---|---|
| 1,634,884 | 7/1927 | Peer | 248/551 |
| 1,761,752 | 6/1930 | Scott | 248/675 |
| 2,277,738 | 3/1942 | Wilkinson | 248/201 |
| 2,696,357 | 12/1954 | Elmer | 248/201 |
| 2,994,395 | 8/1961 | Hall | 248/507 |
| 3,410,122 | 11/1968 | Moses | 70/58 |
| 3,625,031 | 12/1971 | Alley | 70/58 |
| 3,673,828 | 7/1972 | Jones | 70/58 |
| 3,705,612 | 12/1972 | Comley | 151/39 |
| 3,790,114 | 2/1974 | Italiano | 248/675 |
| 3,799,483 | 3/1974 | Chiappinelli | 248/27.1 |
| 3,804,357 | 4/1974 | Robinett et al. | 243/203 |
| 3,822,049 | 7/1974 | Saunders | 248/203 |
| 3,945,227 | 3/1976 | Reiland | 70/58 |
| 3,965,705 | 6/1976 | Nadler | 70/58 |
| 3,977,221 | 8/1976 | Foote | 70/58 |
| 4,028,913 | 6/1977 | Falk | 70/58 |
| 4,047,686 | 9/1977 | Porter | 70/58 X |
| 4,065,946 | 1/1978 | Loynes et al. | 70/58 |
| 4,078,182 | 3/1978 | Arney et al. | 307/10 |
| 4,081,979 | 4/1978 | Dawson | 248/551 |
| 4,085,369 | 4/1978 | Burke | 70/58 |
| 4,107,958 | 8/1978 | Manley | 248/507 |
| 4,117,700 | 10/1978 | Saunders | 70/58 |
| 4,131,173 | 12/1978 | Boersma | 180/90 |
| 4,169,624 | 10/1979 | Yefsky | 296/32.12 |
| 4,170,324 | 10/1979 | Stubbings | 224/279 |
| 4,211,995 | 7/1980 | Smith | 328/138 |
| 4,237,949 | 12/1980 | Wagner | 151/67 |
| 4,248,069 | 3/1981 | Burbank | 70/160 |
| 4,299,132 | 11/1981 | Dellantonio | 74/10.33 |
| 4,408,742 | 10/1983 | Korb | 248/201 |

Primary Examiner—Ramon S. Britts
Assistant Examiner—Ramon O. Ramirez

[57] ABSTRACT

Automobile radio or tape deck retainer including a bracket to fit over the protruding adjustment shaft of the radio, connected to a flexible, sever-resistant cable extending from the bracket along the side of the radio to a structural portion of the automobile, to which the cable is secured.

9 Claims, 3 Drawing Figures

AUTOMOBILE RADIO ANTI-THEFT RETAINER

BACKGROUND OF THE INVENTION

This invention relates to securing radios and tape decks in automobiles (the term "automobile", as used herein, refers to any motorized vehicle for transporting one or more people, e.g. cars, trucks, buses, etc.)

A major drawback associated with having a radio or tape deck installed in the dash of an automobile is that such devices are considered easy targets by thieves. In many cases, after an automobile has been broken into, forcible removal of a radio or tape deck from the dash of an automobile takes a practiced thief a matter of seconds.

SUMMARY OF THE INVENTION

The present invention provides a method and apparatus for securing a radio or tape deck in an automobile which makes its forcible removal virtually impossible without theft of the entire car. In general, the invention features retainer apparatus for retaining in an automobile dash a radio or tape deck having a top surface, or bottom surface, and two side surfaces, and at least one adjustment shaft protruding from a front surface. (Virtually all automobile radios have two such shafts, onto which fit the tuner and volume control knobs; virtually all automobile tape decks have at least a shaft for a volume control knob). The retainer apparatus (which will commonly be paired, as will be seen, but which can be solitary) includes bracket means adapted to fit over a protruding adjustment shaft without interfering with the adjustment function of the shaft. Connected to the bracket means is flexible, sever-resistant means adapted to extend from the bracket means along a side, top, or bottom surface to a structural portion of the automobile. The sever-resistant means is connected to the structural portion of the automobile by securing means.

In preferred embodiments the bracket means is composed of a plastic or rubber coated (to prevent scratching) metal piece bent to form a first and a second leg at right angles to each other, the first leg having a slot adapted to receive the adjustment shaft, the bend defining the two legs being such that the first portion lies flush against the front surface of the radio or tape deck and the second leg lies flush against a side surface of the radio or tape deck.

The slot in the first leg of the bracket is preferably oblong shaped (i.e., it is a rectangle with rounded corners) and is about 1 1/16 (i.e., 17/16) inches wide and about ⅜ inches high, and is surrounded by about a 3/16 inch width of metal; the dimensions provide virtual universality of fit, i.e., the bracket will fit almost all 2-shaft radios without interfering with shaft movement, while aligning the bend in the bracket with the edge defining the meeting of the front and side surfaces of the radio or tape deck.

The sever-resistant means in preferably wire rope which can be guided around any obstacles in the automobile between the radio or tape deck and the firewall. The wire rope can be attached, e.g. welded, to the bracket in a notch in its second adapted to receive it. The wire rope is preferably of a length which allows a minimum of slack, i.e., it is pulled tight through the firewall and then fastened, so that a would-be thief cannot pull the radio out far enough to apply cutting means, i.e. a torch, to the sever-resistant means (sever-resistant does not, of course, mean incapable of being cut by any device; it means incapable of being severed by the pulling force exerted by a person, and resistant to severing by other means).

The apparatus of the invention makes theft of automobile radios and tape decks virtually impossible. Furthermore, the materials used are all inexpensive and installation is relatively simple, sometimes requiring drilling two holes in the firewall, and sometimes, if there are already suitable holes present, not even requiring drilling.

Other features and advantages of the invention will be apparent from the following description of the preferred embodiments thereof, and from the claims.

DESCRIPTION OF THE PREFFERED EMBODIMENTS

The drawings will first be described.

DRAWINGS

STRUCTURE

Figure 1:
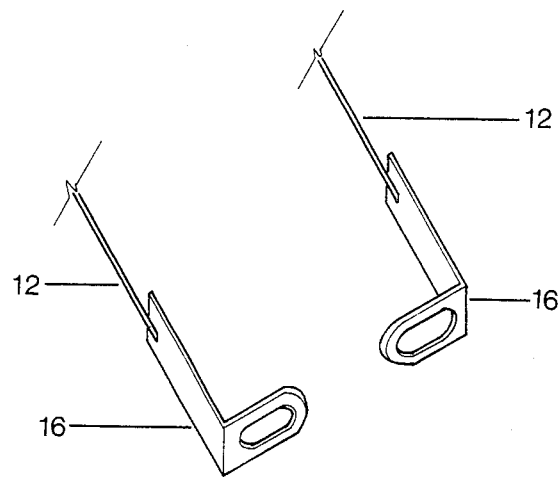
FIG. 1 is a perspective view of retainer apparatus of the invention.

Shown diagramatically in FIG. 1, the retainer 8 includes two equal components, each including cable clamp 10, which is attached to a two foot long, ⅛" diameter 7×7 steel wire rope 12. The wire rope is welded to the steel bracket 16.

Figure 2:
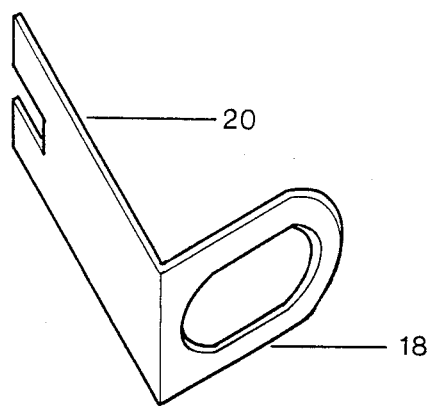
FIG. 2 is a perspective view of the bracket shown in FIG. 1.

The bracket 16, detailed in FIG. 2, can universally accommodate the variety of adjustable shafts common to automobile in-dash radios, stereo receivers and cassette tape players. Each bracket is made of 3/32" thick steel and has a slotted leg 18 and a notched leg 20. The slotted leg 18 measures 1 7/16" wide and ¾" high. The slot is ⅜" high, with semi-circular ends and is 1 1/16" long. The slot is placed symmetrically within the leg 18 providing 3/16" of steel on all sides of the slot. These dimensions are critical since they are the maximum outer dimensions and minimum interior dimensions required to fit nearly one hundred separate stereo receiver models that have 2 shafts.

Figure 3:
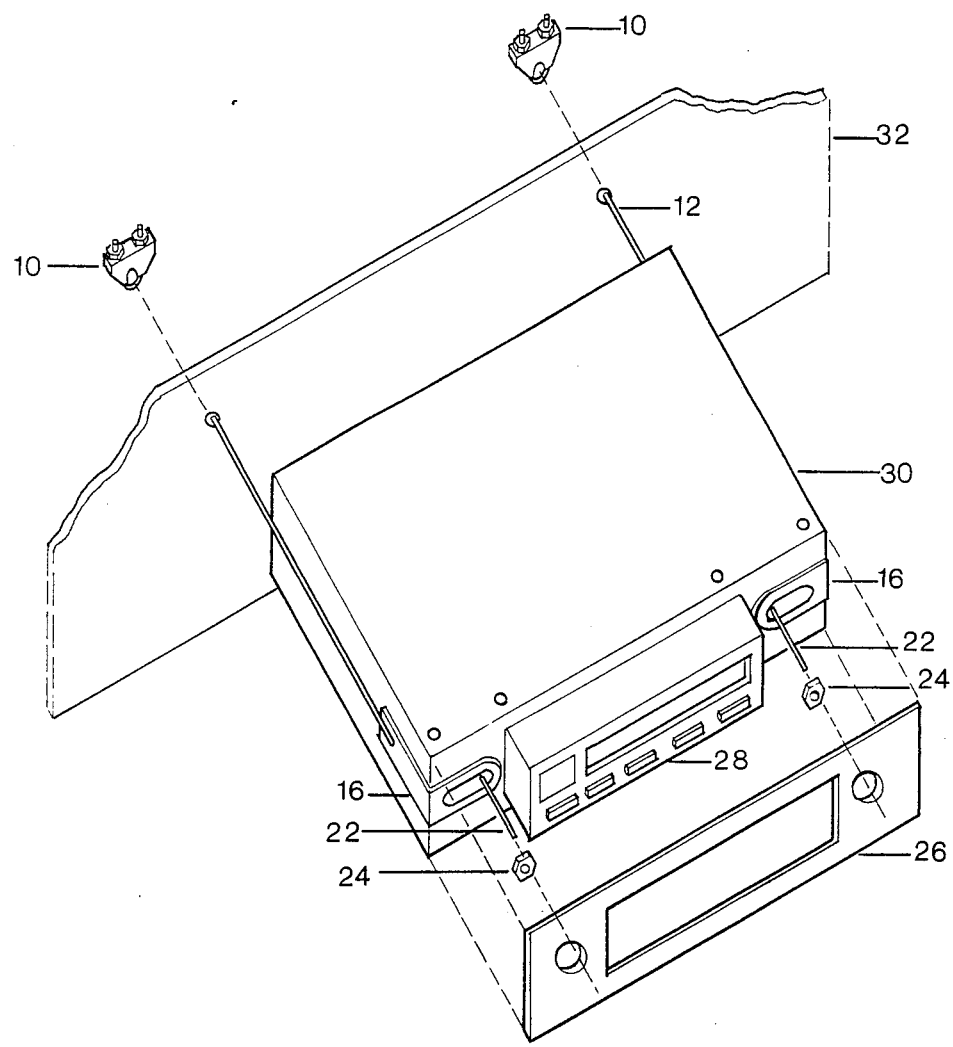
FIG. 3 is a partially exploded view of the apparatus of FIG. 1, illustrating its installation.

The end of the slotted leg is curved in order to avoid interfering with the radio's nosepiece 28, as shown in FIG. 3. The notched leg 20 of the bracket, is 3/32" thick, ¾" high and 2" long. The notch at the end is symmetrically placed along the horizontal axis and measures ⅛" high and ½" long. It accommodates the ⅛" wire rope to which it is welded.

The bracket 16 is coated with a brightly colored 1 mil. thick layer of plastic. The plastic coating is used to protect the chassis 30 (FIG. 3) from damage and to readily indicate the presence of the device when the radio's faceplate 26 (FIG. 3) is removed.

OPERATION

Referring to FIG. 3, the retainer is installed by removing the receiver's shaft retainer nuts 24, placing the shaft 22 through the slot of the bracket 16 and tightening it to the chassis 30 with the nut 24. The bracket should be installed with the notched leg 20 tight against the side of the chassis.

The wire rope 12 is then passed through the firewall at either an existing hole in the particular automobile or a 3/16" hole drilled in the firewall. The use of wire rope permits field adjustments to avoid a particular automobile's under-dash wiring, cables, heating ducts, and similar potential obstructions. Once the cable 12 is through the firewall 32 the cable clamp 10 is temporarily fastened to the end of the wire rope 12. The receiver is then installed with all the various electrical connections such as antenna, power and speaker leads. The additional length of the wire rope permits this flexibility during installation.

With the receiver in place the wire rope 12 is then drawn tight through the firewall 32. The cable clamps are then brought up tight to the firewall, where they are permanently secured. The ends of the two wire ropes are then overlapped and taped together with electrician's tape. In order to remove the receiver without damaging it the above procedure is followed in reverse.

The installation of the retainer is completed by attaching self-sticking warning labels to the driver and front passenger's door glass and one label to the dashboard adjacent to the receiver.

OTHER EMBODIMENTS

Other embodiments are within the following claims. For example, if the path from the side of the radio or tape deck to the firewall is straight, a metal sleeve can cover the wire rope all or a portion of the way to the firewall; the sleeve provides further protection against severing and, if it extends all the way to the firewall, provides the additional advantage of protecting the radio or tape deck from being pushed into the dash, as well as from being pulled out.

The bracket means can also vary. For example, a flexible rather than rigid piece of metal can be used, e.g. a piece of metal cloth having a slot to receive the adjustment shaft, and capable of bending around the corner of the radio or tape deck to attach to the flexible, sever-resistant means. Further, the sever-resistant means can be an extension of the bracket means, e.g. in the case of metal cloth bracket means, the sever-resistant means can constitute an extension of the metal cloth.

Although it is preferred that the sever-resistant means run along a side surface of the radio or tape deck, it can also run along the top or bottom surface if the particular geometry involved permits.

What is claimed is:
1. Retainer apparatus for retaining in an automobile dash a radio or tape deck having a top surface, a bottom surface, and two side surfaces, and at least two adjustment shafts protruding from a front surface, said retainer apparatus comprising a pair of bracket means adapted to fit over said, protruding adjustment shafts; connected to said bracket means, flexible, sever-resistant means adapted to extend from said bracket means to a structural portion of said automobile,
and means for securing said flexible, sever-resistant means to said structural portion of said automobile,
each of said bracket means comprising a metal piece bent to form a first and a second leg at right angles to each other, the first leg having a slot adapted to receive one of said adjustment shafts, the bend defining such leg being such that the first leg lies flush against said front surface of said radio or tape deck and said second leg lies flush against a side surface of said radio or tape deck.
2. The apparatus of claim 1 wherein said second leg lies flush against a said side surface and said slot is about 1 1/16 inches wide and about ⅜ inches high, and is surrounded by about 3/16 inch width of metal.
3. The apparatus of claim 1 wherein said slot is oblong shaped.
4. The apparatus of claim 1 wherein said second leg of said metal piece is notched to receive said flexible sever-resistant means.
5. The apparatus of claim 1 wherein said bracket means comprises a plastic-coated metal piece.
6. The apparatus of claim 1 wherein said first leg of said metal piece is rounded at its end to prevent interference of said metal piece with the nose piece of said radio.
7. The apparatus of claim 1 wherein said flexible sever-resistant means comprises wire rope.
8. The apparatus of claim 1 wherein said means for securing, said flexible sever-resistant means to said structural portion of said automobile comprises a cable clamp.
9. The apparatus of claim 1, wherein said structural portion of said automobile is the firewall of said automobile.

* * * * *